United States Patent
LeFave

(10) Patent No.: US 6,809,150 B1
(45) Date of Patent: Oct. 26, 2004

(54) METHOD OF PROTECTING SURFACES FROM CORROSION

(75) Inventor: Jacques T. LeFave, Jean, NV (US)

(73) Assignee: Rust Bullet, LLC, Reno, NV (US)

( * ) Notice: Subject to any disclaimer, the term of this patent is extended or adjusted under 35 U.S.C. 154(b) by 0 days.

(21) Appl. No.: 10/295,204

(22) Filed: Nov. 14, 2002

(51) Int. Cl.[7] ............... C08K 13/02; C08K 5/101; C08K 5/01; C08K 3/08
(52) U.S. Cl. ............... 524/773; 524/786
(58) Field of Search ............... 524/441, 786, 524/773

(56) References Cited

U.S. PATENT DOCUMENTS

| | | | |
|---|---|---|---|
| 4,098,844 A | 7/1978 | Tsugukuni et al. ...... 260/859 R |
| 4,279,962 A | 7/1981 | Meyer et al. ............... 428/332 |
| 4,383,070 A * | 5/1983 | Markusch et al. .......... 524/317 |
| 4,484,951 A | 11/1984 | Uchimura et al. .......... 106/290 |
| 4,567,230 A * | 1/1986 | Meyer et al. ............... 524/786 |
| 4,657,953 A * | 4/1987 | Kojo et al. ................. 523/435 |
| 4,857,623 A | 8/1989 | Emmerling et al. .......... 528/28 |
| 5,081,203 A | 1/1992 | Pedain et al. ................. 528/49 |
| 5,179,187 A | 1/1993 | Pedain et al. ................. 528/59 |
| 5,372,638 A | 12/1994 | DePue et al. ............... 106/404 |
| 5,389,139 A | 2/1995 | Carpenter et al. .......... 106/404 |
| 5,391,614 A * | 2/1995 | Chandalia et al. ...... 524/773 X |
| 5,391,686 A | 2/1995 | Jadhav et al. ................. 528/77 |
| 5,452,716 A | 9/1995 | Clift ............................ 128/633 |
| 5,494,512 A | 2/1996 | Yamamoto et al. ......... 106/404 |
| 5,494,741 A | 2/1996 | Fekete et al. ............... 428/331 |
| 5,587,448 A | 12/1996 | Engen .......................... 528/55 |
| 5,589,535 A | 12/1996 | Schwab et al. ............. 524/591 |
| 5,596,098 A | 1/1997 | Nikles et al. ............... 544/357 |
| 5,686,136 A | 11/1997 | Nikles et al. ............... 427/127 |
| 5,695,812 A | 12/1997 | Pritchett |
| 5,817,732 A | 10/1998 | Asahina et al. ............... 528/45 |
| 5,931,996 A | 8/1999 | Reisser et al. .............. 106/404 |
| 5,944,886 A | 8/1999 | Hashizume ................. 106/404 |
| 5,964,936 A | 10/1999 | Reisser ....................... 106/404 |
| 5,998,532 A | 12/1999 | Urs ............................. 524/507 |
| 6,132,504 A | 10/2000 | Kuntz et al. ................ 106/404 |
| 6,277,450 B1 | 8/2001 | Katoot et al. ............... 427/512 |
| RE37,386 E * | 9/2001 | Melby et al. ................. 528/60 |
| 6,368,669 B1 | 4/2002 | Hughes et al. ........... 427/385.5 |
| 6,398,861 B1 | 6/2002 | Knox .......................... 106/404 |
| 6,409,814 B1 | 6/2002 | Bosch et al. ................ 106/404 |
| 6,417,252 B1 | 7/2002 | Hiraoka et al. ............. 523/406 |
| 2002/0006996 A1 * | 1/2002 | Lane et al. .................. 524/441 |

OTHER PUBLICATIONS

L. Sung et al., "Effect of Aluminum Flake Orientation on Coating Appearance", *Proceedings of the 79th Annual Meeting Technical Program of the FSCT*, pp. 453–462, Nov. 2001.

* cited by examiner

Primary Examiner—Matthew A. Thexton
(74) Attorney, Agent, or Firm—Barbara J. Luther; Quarles & Brady Streich Lang, LLP

(57) ABSTRACT

A method of protecting surfaces from corrosion calls for providing a coating material containing polyisocyanates with unreacted, active NCO groups; and applying the coating material to a rust covered surface, whereby the free NCO groups in the coating material react with the moisture in the rust to dehydrate the rust and produce a strong coating which keeps out water and oxygen which corrode surfaces. The active NCO content is about 3% to about 20% NCO groups. Also disclosed is a composition for coating an iron surface, the composition comprising polyisocyanates whose NCO content is between 5% and 30%; and aluminum flakes at about 5% to about 50% by weight.

10 Claims, No Drawings

METHOD OF PROTECTING SURFACES FROM CORROSION

RELATED APPLICATIONS

This application is related to application Ser. No. 10/295,663 filed on the same date as this application, entitled "Method of Protecting Surfaces with Aluminum Flaked Composition," by inventor Jacques T. LeFave.

BACKGROUND

1. Technical Field

The present invention relates to a process for protecting surfaces prone to corrosion by applying a composition that has a relatively high content of unreacted polyisocyanates.

2. Prior Art

Traditionally, it has been problematic to paint directly over rust. Merely painting over rust generally traps moisture and oxygen under the paint, which chemicals continue to corrode the underlying steel surface. Ordinarily, rust must be mechanically or chemically removed before coating. Mechanical methods include sandblasting and applying steel wool. One chemical method is acid treatment.

Various claims have been made about "rust converters." For example, phosphoric acid converts iron oxide to an iron phosphate complex. Latex compositions have been alleged to convert the rust to magnetite. Still other products claim to convert rust to iron stearate, iron rosinate and other iron compounds. These products have varying degrees of effectiveness. However, the products may not last long or require a topcoat, after which the coating still does not last very long.

Aluminum pigments are used widely in coatings as special-effect pigments. The term special-effect pigments is used to denote pigments which have a directed reflection at oriented, metallic or highly light-refractive particles of a predominantly flat configuration. They are always of plate-like or flake-like configuration and have very large particle diameters compared with dye pigments. Their optical properties are determined by reflection and interference. Depending on transparency, absorption, thickness, single-layer or multi-layer structure, the special-effect pigments exhibit a metallic shine, a pearl shine, interference or interference reflection. The main areas of use are in the cosmetics and automobile sectors, in addition in coloring plastic materials, paints, leather coatings, in printing and ceramics.

What is needed is an easy-to-apply coating that simultaneously dehydrates the rust and seals the rust from future oxygen or water attack.

SUMMARY OF THE INVENTION

A method of protecting surfaces from corrosion is disclosed herein. In one embodiment, there is provided a method of protecting surfaces from corrosion, which provides a coating composition containing polyisocyanates with unreacted, active NCO groups. The coating composition is applied to a rust covered surface, whereby the active NCO groups in the coating composition react with the water within rust to dehydrate the rust and produce a strong coating with the underlying iron or steel which keeps out water and oxygen which corrode surfaces. In another embodiment, the active NCO content is about 3% to about 20%. In yet another embodiment, the active NCO content is about 5% to about 15%. In another embodiment, the active NCO content is about 5% to about 15%.

Also disclosed is a composition for coating an iron surface, the composition comprising polyisocyanates whose NCO content is between 5% and 20% and whose aluminum flakes are about 5% to about 50% by weight. In another embodiment, the NCO content is between about 7% and about 25%. In another embodiment, the NCO content is between about 10% and about 20%, between about 10% and 20%, or between about 12% and about 18%. The aluminum flake content is about 7% to about 40%, or preferably between about 10% and about 30%.

These and other features, aspects and advantages of the present invention will become better understood with reference to the following description and appended claims.

DETAILED DESCRIPTION OF A PREFERRED EMBODIMENT

I have discovered that a high concentration of unreacted polyisocyanate in paint provides a barrier to moisture, oxygen and other corrosive and erosive effects of environmental agents. The property of polyisocyanates to absorb moisture from rust as it cures provides a nearly impenetrable barrier to chemical contamination (water and oxygen) of the coated surface. When polyisocyanates are concentrated in the paint film at a high level of unreacted NCO groups, such as between about 6% and about 11% by weight of the applied film, there are sufficient reactive NCO groups to dehydrate surface rust and bond with the rust and underlying steel layers and act as a physical barrier to corrosion.

It has been found that the high-NCO paint of the present invention can be used to restore rusted car bodies. There it is used as a primer coat to dehydrate rust and bond to the rust and underlying steel.

In another embodiment, it has been discovered that the inventive high-NCO paint can be used to overcoat the zinc chromate and other zinc-rich paints frequently used on bridges and other large outdoor structures. Currently in repainting bridges, the zinc chromate paint is first sanded, which creates a toxic powder, and which must be reclaimed before it contaminates the water and harms aquatic life. The high-NCO pigment can be applied directly over the aging zinc chromate paint, thus saving sanding and reclamation costs.

In another embodiment, the inventive high-NCO paint can be applied to crumbling concrete and rusting rebar. New concrete can be installed effectively over the paint.

In one embodiment, the Al-flake paint comprises a solution of an isocyanate mixture, Al-flake paste, thickener gel and solvents. The thickener comprises swellable clay, molecular sieves mixed with solvents.

The Al-flake component may be leafing or non-leafing. Leafing Al pigments orient at or near the film surface. Non-leafing Al pigments are preferred as they are distributed evenly throughout the entire film. Al-flake pigments are available from several suppliers, including but not limited to Toyal America (Naperville, Ill.), US Aluminum (Haskell, N.J.), Eckart America (Louisville, Ky.), Alcoa (Leetsville, Pa.), Alcan (Benton, Ky.), and Silberline Manufacturing Co. (Tamaqua, Pa.). An example of a suitable Al-flake pigment is Lansford-243 aluminum paste (Silberline), which is described as being 60–80% Al flakes and the remainder being two solvents: Stoddard solvent and an aromatic solvent. Another non-leafing Al flake pigment is Sparkle Silver 5245 AR paste from Silberline.

The polyisocyanates, preferably diisocyanates, are the compounds known in the polyurethane and paint sector such as aliphatic, cycloaliphatic or aromatic diisocyanates, the latter being more desirable. Diisocyanates have the formula $Q(NCO)_2$, in which Q is a hydrocarbon radical of 4 to 40 carbon atoms, of about 4 to 20 carbon atoms, and is an aliphatic hydrocarbon of about 4 to 12 carbon atoms, a cycloaliphatic hydrocarbon of 6 to 15 carbon atoms, or preferably an aromatic hydrocarbon of 6 to 15 carbon atoms. Examples of diisocyanates of this type which can be used are tetramethylene diisocyanate, hexamethylene diisocyanate, dodecamethylenediisocyanate, 1,4-diisocyanato-cyclohexane, 3-isocyanatomethyl-3,5,5-trimethylcyclohexane isocyanate (isophorone diisocyanate), 4,4'-diisocyanatodicyclohexylmethane, 2,2-(4,4'-diisocyanatodicyclohexyl)-propane, 1,4-diisocyanato-benzene, 2,4- or 2,6-diisocyanatotoluene or mixtures of these compounds, isomers, 4,4'- or 2,4'-diisocyanatodiphenylmethane, 2,2-(4,4'-diisocyanatodiphenyl)-propane, p-xylylene diisocyanate, $\alpha,\alpha,\alpha',\alpha'$-tetramethyl-m- or p-xylylene diisocyanate, phenylene diisocyanate, 4,4'-diphenyl diisocyanate, 1,5-naphthalene diisocyanate, 3,3'-dimethoxy-4,4'-diphenyl diisocyanate, and mixtures of these compounds. Other similar aromatic diisocyanates also may be used. Apart from these simple polyisocyanates, those containing heteroatoms in the radical linking the isocyanate groups are also suitable, and examples of these are polyisocyanates which contain carbodiimide groups, allophanate groups, isocyanurate groups, urethane groups, acrylated urea groups or biuret groups.

The isocyanate mixtures used in accordance in one embodiment of the invention are reaction products of low molecular weight distillable diisocyanates. One example of such an isocyanate mixture is Desmodur E-28 polyisocyanate resin (Bayer, Pittsburgh, Pa.), which is a polyisocyanate prepolymer based on diphenylmethane diisocyanate (MDI). Desmodur E-28 has an NCO content in the range of about 15.5% to about 17.5%. When combined with other compounds (see below), the paint's NCO content is about 3% to about 20%.

Desmodur E-28 is readily soluble in esters, ketones and aromatic solvents. Only dry solvents and pigments are used with Desmodur E-28 polyisocyanate resin. The MSDS for the product lists polyisocyanate based on MDI at approximately 76%; 4,4'-diphenylmethane diisocyanate (MDI) at approximately 22%; and diphenylmethane diisocyanate (MDI) at approximately 1.4%. Another supplier of isocyanate mixtures is Huntsman Corporation (West Deptford, N.J.).

The thickener gel comprises a swellable clay, molecular sieve product and solvents. Example of swellable clays include but are not limited to Claytone 40 (Southern Clay Products, Inc. (Gonzales, Tex.) and Bentone 34 (NL Industries, Houston, Tex.). Claytone 40 is a tan solid powder comprising crystalline silica; quaternary ammonium compounds, bis (hydrogenated tallow alkyl) dimethyl-, salt with bentonite; and ammonium montmorillonite. Montmorillonite has the formula of $Al_2O_2.4SiO_2.H_2O$. Bentonite is a colloidal native hydrated aluminum silicate clay which consists principally of montmorillonite. It usually contains some magnesium, iron and calcium carbonate. Bentonite has the property of forming highly viscous suspensions or gels with not less than ten times its weight of water and also emulsifies oils.

It may be desirable to include small amounts of rheology control agents, for example fumed silicas, hectorite clays, or bentonite clays. Such materials are usually used at levels of less than 10% based on the total solid weight of reactants. Rheology control agents are used to control the flow and leveling of the composition during application and curing steps. The rheology control agent is also useful for controlling the metallic appearance of the coating. Such materials may help "fix" the pigment flake surface in an alignment parallel to the surface of the coating to maximize the interleaving of the Al flakes in the instant invention.

The molecular sieve, or zeolite, is a member of a family of hydrous Al silicate materials whose atoms enclose sodium, potassium, calcium, strontium and barium. They are chiefly used as molecular filters, and in this case to absorb water from the swellable clay. One example of a suitable zeolite is Baylith L powder (A. B. Colby, Inc., McMurray, Pa.), which is sold in active, water-free form. The product is a moisture scavenger for coating systems. UOP (A. B. Colby, Inc.) also makes a comparable zeolite.

Organic solvents are used in both the thickener gel and in the final formulation. Examples include xylene and isobutyl acetate. In lieu of isobutyl acetate, several other slow-drying, polar solvents such as n-butyl acetate, methyl isobutyl ketone (MIBK), methyl n-butyl ketone (MNBK), monoether ethylene glycol acetate (EE Acetate), cellosolve acetate, propyleneglycol methyl ether acetate (PM acetate) can be used. Additional cosolvents may be added to aid in stabilization or application of the composition. Other solvents are acetates such as hexyl acetate, octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Toluene can be used to replace all or part of the xylene, although the applied paint may dry faster with toluene.

EXAMPLES

Example 1

The paint is mixed and stored under a dry atmosphere, such as nitrogen or air, to avoid the absorption of water, which inactivates isocyanates, and to avoid oxidation of the Al-flake pigment. First, a thickener gel or binder is prepared with 1 kg Claytone 40, and 1 kg 4 A molecular sieve (such as Baylith L powder, AB Colby, McMurray, Pa.). These compounds are mixed and combined with about 8.5 kg of solvent, which is divided between xylene and isobutyl acetate.

Next 25.5 kg of solvent, divided between xylene and isobutyl acetate is added to the binder. Then 18.5 kg of non-leafing aluminum flake paste is added to the mixture, followed by 55 kg of Desmodur E-28 (Bayer), and mixed until smooth. Care should be taken not to overdisperse the flakes, or they may lose their flatness. The paint provided good coverage.

Example 2

The same mixture was prepared, except that leafing aluminum flake paste was used. A test surface was coated with the paint and allowed to dry. When the painted test surface was rubbed, the aluminum flaked off, which was deemed undesirable.

Example 3

In another example, a partially rusted corrugated steel roof (about 75% rust, the remainder retaining some galvanized zinc) was spray coated with two coats of the paint of Example 1. The paint protected the remaining steel and restored the overall appearance at a fraction of the cost of sheet metal replacement.

Example 4

General: Nine coated metal test panels were submitted to the National Testing Standards Inc., along with a tenth, uncoated panel as a control. The test panels were scribed through to the metal substrate and subjected sequentially to a series of environmental exposures. If the coating on a panel exhibited visible degradation, testing of that panel was terminated. The following panels were coated according to the manufacturers' directions:

Panel 1 Rust-Oleum Rusty Metal Primer/Gloss Enamel

Panel 2 Rust Bullet high-NCO paint—two layers, no topcoat

Panel 3 Rust-Oleum Rust Reformer/Rust-Oleum Glass Enamel

Panel 4 Zynolyte urethane/Zinc-chromate primer

Panel 5 Rust-Oleum Cold Galvanizing compound

Panel 6 Wasser Brand System

Panel 7 Naval Jelly Rust Neutralizer/Napa Ruf-Nek HD spray paint

Panel 8 POR-15 System/Napa Rud-Nek HD spray paint

Panel 9 Hammerite Rust Cap

Accelerated Weathering

All test and control panels were exposed to 168 hours of accelerated weathering in an Atlas Weatherometer model 18W type HH (Atlas, Chicago, Ill.). The apparatus and operation were in accordance with the procedures set forth in ASTM G-23. None of the nine test panels exhibited any degradation of the integrity of the coating, while the control panel exhibited light surface rusting.

Thermal Shock

After accelerated weathering all of the test and control panels were thermal cycled according to ASTM D-2337. The high temperature was 160° F. and the low temperature was −20° F. Two cycles consisting of 3 hours each were preformed. None of the exposed coated panels exhibited any visible evidence of coating degradation; however, the control panel exhibited additional surface rusting.

Seawater Spray (Fog)

After thermal cycling all test and control panels were scribed through to the metal substrate and placed in a salt spray/fog chamber for 500 hours (three weeks). The chamber was operated in accordance with the procedures set forth in ASTM B-117, except that actual seawater was used in place of standardized salt water. Panel numbers 2, 5, 6, and 8 exhibited corrosion along the scribe line with undercutting of the paint being less than 3/16 inch. Panel numbers 1, 3, 4, 7 and exhibited coating failure over the entire surface of the panel. These panels were considered complete failures and were eliminated from further testing. The control panel was corroded enough to be of little further value and was also eliminated from further testing.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of protecting surfaces from corrosion, the method comprising providing a coating material consisting essentially of polyisocyanates with unreacted, active NCO groups, non-leafing aluminum flakes, xylene, isobutyl acetate, thickener gel and molecular sieve; and applying the coating material to a rust covered surface, whereby the active NCO groups in the coating material react with water in the rust to dehydrate the rust and produce a strong coating which keeps out water and oxygen which corrode surfaces.

2. The method of claim 1, wherein the active NCO content is about 3% to about 20% by weight.

3. The method of claim 1, wherein the active NCO content is about 5% to about 15% NCO groups by weight.

4. The method of claim 1, wherein the active NCO content is about 7% to about 10% NCO groups by weight.

5. A composition for coating an iron surface, the composition consisting essentially of polyisocyanates whose NCO content is between about 5% and about 30% by weight;

aluminum flakes at about 5% to about 50% bay weight;

xylene;

isobutyl acetate, thickener gel; and molecular sieve.

6. The composition of claim 5 wherein the NCO content is between about 7% and about 25% by weight.

7. The composition of claim 5 wherein the NCO content is between about 10% and about 20% by weight.

8. The composition of claim 5 wherein the NCO content is between about 12% and about 18% by weight.

9. The composition of claim 5 wherein the aluminum flake content is about 7% to about 40% by weight.

10. The composition of claim 5 wherein the aluminum flake content is about 10% to about 30% by weight.

* * * * *